L. BELLY.
Rotary Harrows and Rollers.
No 157,307. Patented Dec. 1, 1874.
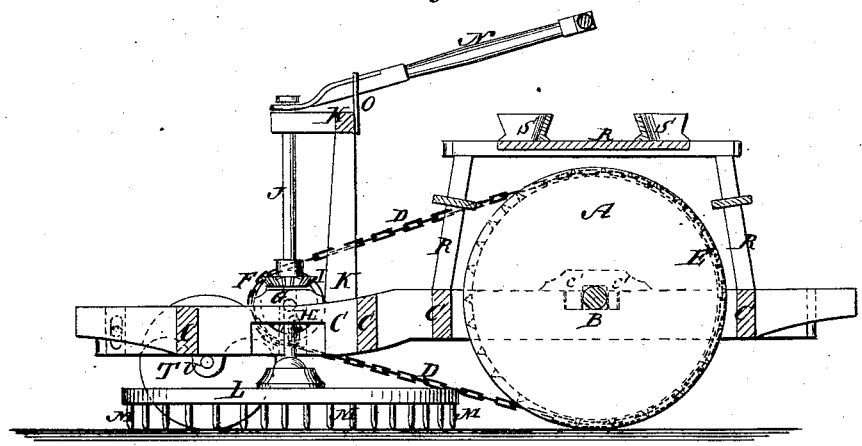
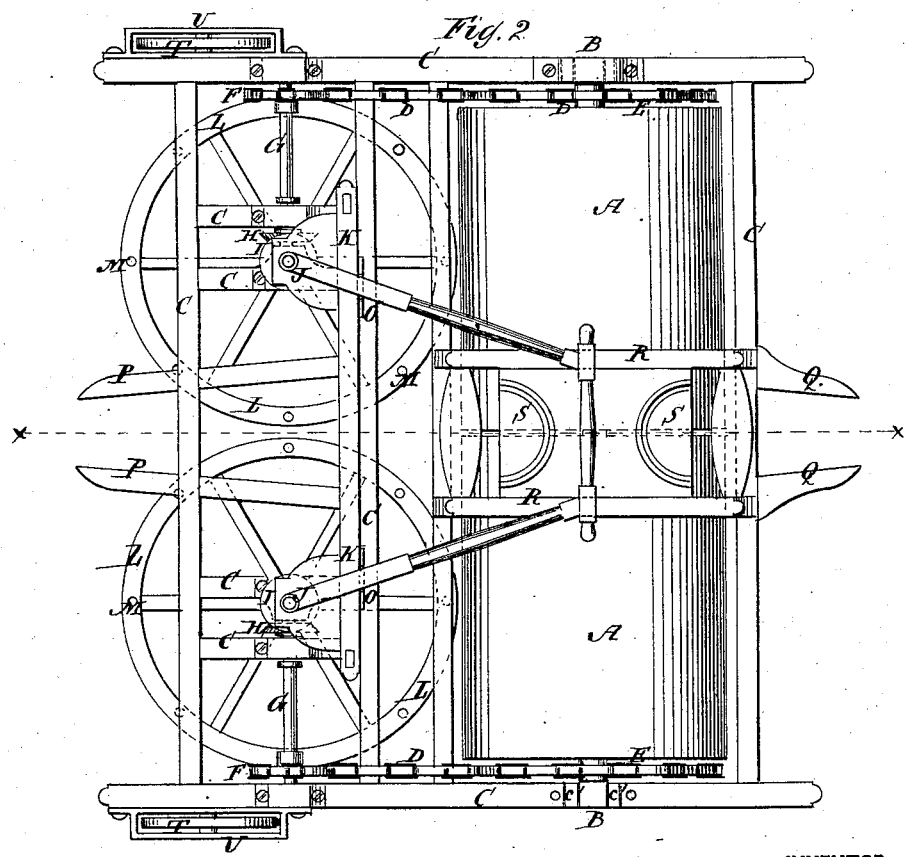

UNITED STATES PATENT OFFICE.

LOUIS BELLY, OF ST. ANNE, ILLINOIS.

IMPROVEMENT IN ROTARY HARROWS AND ROLLERS.

Specification forming part of Letters Patent No. 157,307, dated December 1, 1874; application filed June 13, 1874.

*To all whom it may concern:*

Be it known that I, LOUIS BELLY, of St. Anne, in the county of Kankakee and State of Illinois, have invented a new and useful Improvement in Combined Rotary Harrow and Roller, of which the following is a specification:

Figure 1 is a vertical section of my improved machine, taken through the line $x\ x$, Fig. 2. Fig. 2 is a top view of the same.

Similar letters of reference indicate corresponding parts.

The invention relates to improvement in cultivating-machines wherein rotary harrows are employed. It consists in an arrangement of parts whereby the harrows are supported entirely by the rollers and front wheels of the frame, and the revolution of the harrows arrested when raised from the ground, as hereinafter described.

A represents the two parts of the roller, which are placed end to end upon the same shaft B, and revolve entirely independent of each other. The ends of the shaft B are made square, and rest in notches or rabbets formed in the side bars of the frame C, which notches or rabbets are made longer than the width of the said axle, and are provided with blocks $c'$, to take up the remaining space, so that by shifting the said blocks from one side to the other of the shaft B, the shaft B may be moved forward or backward to loosen or tighten the endless chains D, that pass around the large chain or spur wheels E, rigidly connected with the outer ends of the roller A. The endless chains D also pass around small chain or spur wheels F, attached to the short shafts G, which revolve in bearings in the forward part of the frame C, and to the inner ends of which are attached small bevel-gear wheels H, into the teeth of which mesh the teeth of the small bevel-gear wheels I, attached to the vertical shafts J. The lower parts of the shafts J revolve in bearings attached to the main frame C, and their upper parts revolve in bearings attached to the vertical frame K. To the lower ends of the vertical shafts J, below the frame C, are attached the hubs of the harrow-wheels L, to the rims of which are attached the harrow-teeth M. With the upper ends of the vertical shafts J, above their upper bearings, are connected the ends of the levers N, which rest upon fulcrum plates or supports O, attached to the vertical frame K. The rear ends of the two levers N project to a point midway between the two driver's seats, and are connected by a cross-bar, so that they can be conveniently operated by the driver when sitting upon either seat.

By this construction, by operating the levers N, the harrow-wheels L can be raised from the ground to allow rubbish to drop off, and to be supported while turning the machine or passing from place to place, or when it is desired to roll the ground without harrowing it, the upward movement of the shafts J throwing the gear-wheels I H out of gear.

The harrow-wheels L may be held away from the ground for any desired length of time by some suitable catch attached to the seat-frame, to catch upon the cross-bar of the said levers N.

P Q are hounds, which are attached to the middle part of the front and rear sides of the frame C, so that the tongue can be attached to the hounds P when the ground is to be first harrowed and then rolled, and to the hounds Q when the ground is to be first rolled and then harrowed. R is a frame or platform, the posts of which are attached to cross-bars of the frame C, upon the front and rear sides of the middle part of the roller A, and to each end of which is attached a driver's seat, S, so that the driver can sit with his face toward his horses, to whichever side of the machine the horses may be attached. The part of the frame C with which the harrow-wheels L are connected is supported by small wheels T, which are pivoted in and to small frames U, which frames are secured to the outer sides of the end bars of the frame C by bolts, so that, by loosening the said bolts, the frames U and wheels T may be raised or lowered to cause the harrow-teeth to work deeper or shallower in the ground, as may be desired.

I do not claim the combination with rollers of rotary harrows capable of being raised off the ground by means of a lever or other device; but

Having thus described my invention, I claim as new, and desire to secure by Letters Patent—

The combination of the harrows L, vertically-sliding shafts J, levers N, bevel-gears I, keyed on said shafts, the gears H, short shafts G, rollers A A, wheels T, and frame C, all arranged as shown and described, whereby the harrows are supported by the wheels and rollers, and their revolution is arrested when raised off the ground, as specified.

LOUIS BELLY.

Witnesses:
    JOSEPH DALPAE,
    MICHAEL LE FELLIER.